US010689101B2

(12) United States Patent
Haley et al.

(10) Patent No.: US 10,689,101 B2
(45) Date of Patent: Jun. 23, 2020

(54) INDIRECT MOTOR DRIVE TRAIN FOR RC VEHICLES

(71) Applicant: HORIZON HOBBY, LLC, Champaign, IL (US)

(72) Inventors: James Haley, Champaign, IL (US); David Eichstedt, Champaign, IL (US)

(73) Assignee: Horizon Hobby, LLC, Champaign, IL (US)

( * ) Notice: Subject to any disclaimer, the term of this patent is extended or adjusted under 35 U.S.C. 154(b) by 474 days.

(21) Appl. No.: 15/416,592

(22) Filed: Jan. 26, 2017

(65) Prior Publication Data

US 2017/0210464 A1    Jul. 27, 2017

Related U.S. Application Data

(60) Provisional application No. 62/287,710, filed on Jan. 27, 2016.

(51) Int. Cl.
*B64C 27/14* (2006.01)
*B64C 27/08* (2006.01)
*B64C 39/02* (2006.01)

(52) U.S. Cl.
CPC .............. *B64C 27/14* (2013.01); *B64C 27/08* (2013.01); *B64C 39/024* (2013.01); *B64C 2201/027* (2013.01); *B64C 2201/108* (2013.01); *B64C 2201/146* (2013.01); *B64C 2201/165* (2013.01)

(58) Field of Classification Search
CPC .............. B64C 1/061; B64C 2201/042; B64C 2201/021; B64C 2201/024; B64C 2201/06; B64C 2201/104; B64C 2201/108; B64C 2201/00; B64C 27/08; B64C 27/473; B64C 27/14; B64C 27/20; B64C 27/52; B64C 29/00; B64C 29/0025; B64C 29/0033; B64C 29/02; B64C 39/024
See application file for complete search history.

(56) References Cited

U.S. PATENT DOCUMENTS

| | | | |
|---|---|---|---|
| D774,941 S * | 4/2014 | Yamazaki | |
| 9,061,763 B1 * | 6/2015 | Christensen | |
| 9,109,575 B2 * | 8/2015 | Weddendorf | |
| 9,187,174 B2 * | 11/2015 | Shaw | |
| 9,221,536 B2 * | 12/2015 | Wang | |
| 9,388,794 B2 * | 7/2016 | Weddendorf | |
| D691,514 S * | 12/2016 | Lupashin | |
| 2014/0217229 A1 * | 8/2014 | Chan | |

* cited by examiner

*Primary Examiner* — Justin M Benedik
(74) *Attorney, Agent, or Firm* — Baker Botts L.L.P.

(57) ABSTRACT

The present disclosure describes an indirect motor drive train for RC vehicles. Example embodiments include RC vehicles such as helicopters (and more specifically quadcopters) with a housing and housing arms that extend radially from the housing. Protected within each housing arm is a motor and indirect drive train. In operation, the drive train may include a first gear and a second gear with corresponding teeth that mesh together to translate motion from the motor axis to a propeller axis.

20 Claims, 5 Drawing Sheets

INDIRECT MOTOR DRIVE TRAIN FOR RC VEHICLES

CROSS REFERENCE TO RELATED APPLICATIONS

This application claims the benefit of priority under 35 U.S.C. § 119(e) to U.S. Provisional Patent Application No. 62/287,710, filed Jan. 27, 2016. The disclosure set forth in the referenced application is incorporated herein by reference in its entirety.

FIELD

The disclosed systems and methods relate generally to remote control ("RC") vehicles and drive trains for RC vehicles.

BACKGROUND

During operation of an RC vehicle, debris (e.g., grass, carpet fibers, strings, and hairs) may accumulate around one or more components of the RC vehicle, such as the various components of a power train. This accumulation of debris negatively impacts both the performance of the RC vehicle and the useful life of the affected motor.

Some prior RC vehicles relied upon a vertical powertrain with no debris protection. During operation of these prior RC vehicles, the motor output shaft or other portions of the drive train, such as gearing or driveshafts, would accumulate debris as a result of the quickly spinning output shafts or drive shafts and gearing catching up loose debris in the vicinity of the drive train. As a result of this debris accumulation, these motors were unable to perform at their rated capacities and required replacement at a higher frequency. The vertical motor limitation also introduced packaging constraints and could cause weaknesses in the structural integrity of the RC vehicle housing.

SUMMARY

The present disclosure may comprise one or more of the following features and combinations thereof.

A remote control ("RC") rotorcraft includes a housing with a plurality of housing arms extending radially outward from the housing. Each of the plurality of housing arms enclose (i) a motor with a motor output shaft that rotates around a first axis, (ii) a first gear coupled to the motor output shaft, and (iii) a second gear. Each second gear is coupled to a propeller drive shaft that rotates around a second axis. Each first gear meshes with each second gear to translate motion between the first axis and the second axis. At least one propeller is coupled to each propeller drive shaft.

A quadcopter includes a housing with four housing arms extending radially outward from the housing. Each of the four housing arms encloses (i) a motor with a motor output shaft that rotates around a first axis, (ii) a first gear coupled to the motor output shaft, and (iii) a second gear. Each second gear is coupled to a propeller drive shaft that rotates around a second axis. Each first gear meshes with each second gear to translate motion between the first axis and the second axis. At least one propeller is coupled to each propeller drive shaft.

A quadcopter includes a housing with at least one housing arm that extends radially outward from the housing. The at least one housing arm encloses (i) a motor with a motor output shaft that rotates around a first axis, (ii) a first gear coupled to the motor output shaft, and (iii) a second gear. Each second gear is coupled to a propeller drive shaft that rotates around a second axis. Each first gear meshes with each second gear to translate motion between the first axis and the second axis. At least one propeller is coupled to each propeller drive shaft.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

For example, some of the figures and embodiments disclosed illustrate helicopters, specifically helicopters containing four powertrains. These helicopters with four powertrains (or four sets of rotors or propellers) are sometimes referred to as quadcopters or drones. The disclosed invention is not intended to be limited to quadcopters or drones and one of skill in the art would readily understand how the described embodiments could apply to other RC vehicles with differing numbers of powertrains (or rotors or propellers).

Figure 1:
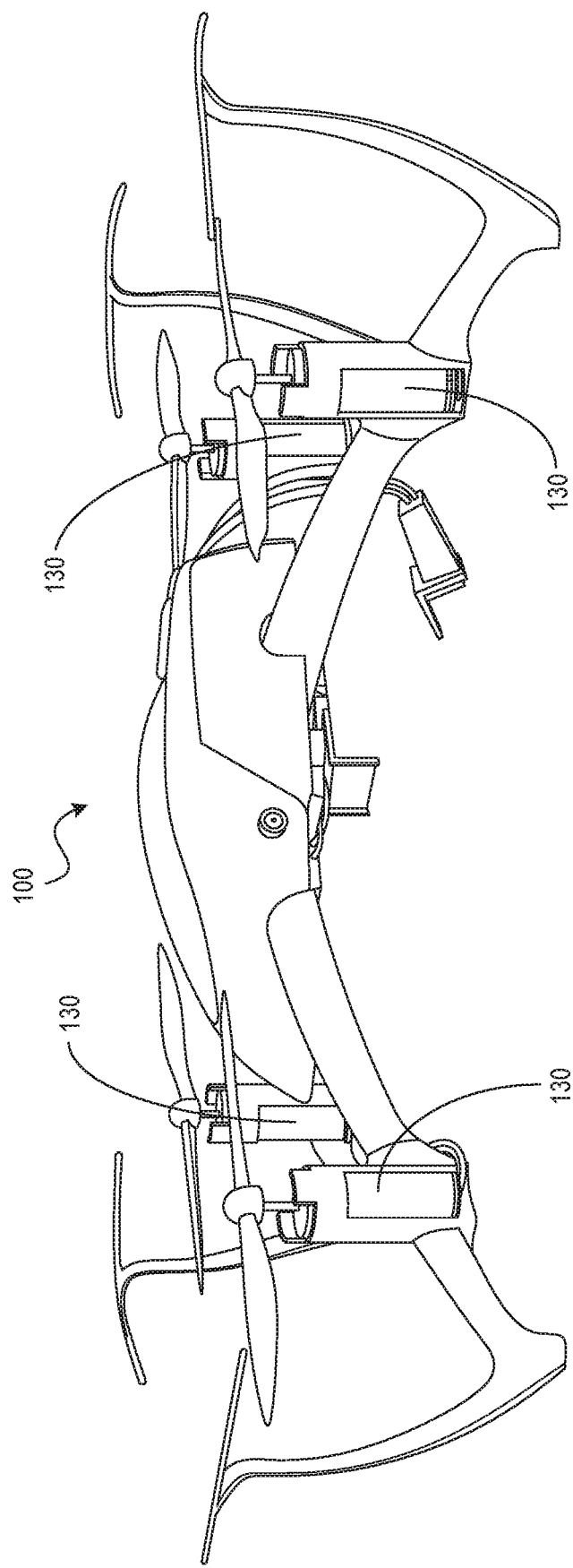
FIG. 1 illustrates an RC helicopter with a vertical motor drive train, according to prior art RC vehicles.

FIG. 1 illustrates an RC helicopter with a vertical motor drive train, according to prior art RC vehicles. FIG. 1 illustrates a quadcopter 100 with four vertical drive trains 130. The vertical drive trains 130 are illustrated as direct drive. In other words, the vertical drive trains 130 have a motor output shaft that directly drives the rotors of the quadcopter. Other prior art RC vehicles may include vertical drive trains that include some type of gearing such that the vertical drive trains are not direct drive.

Figure 2:
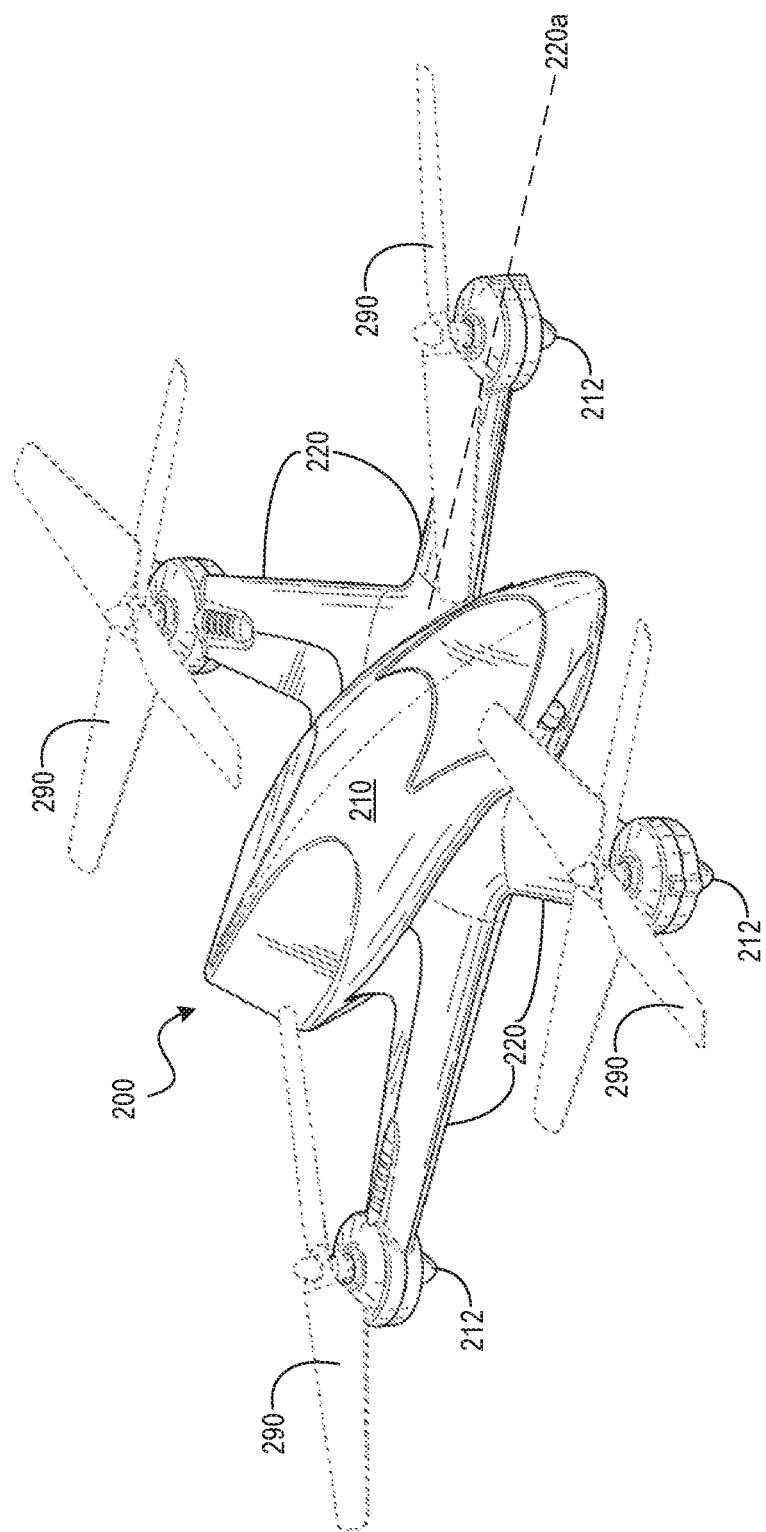
FIG. 2 is a perspective view of a quadcopter, according to an example embodiment.

FIG. 2 is a perspective view of a quadcopter, according to an example embodiment. FIG. 2 illustrates a quadcopter 200 with a housing 210, legs 212, four housing arms 220 that extend radially outward from the housing 210, a central housing arm axis 220a, and propellers 290. The perspective view of FIG. 2 illustrates only three legs 212 but a fourth leg is located underneath the remaining housing arm. The legs 212 allow the quadcopter 200 to sit in a horizontal position when it is not in operation. The central housing arm axis 220a is illustrated for one of the four housing arms 220, although each of the housing arms 220 has a central axis.

Figure 3:
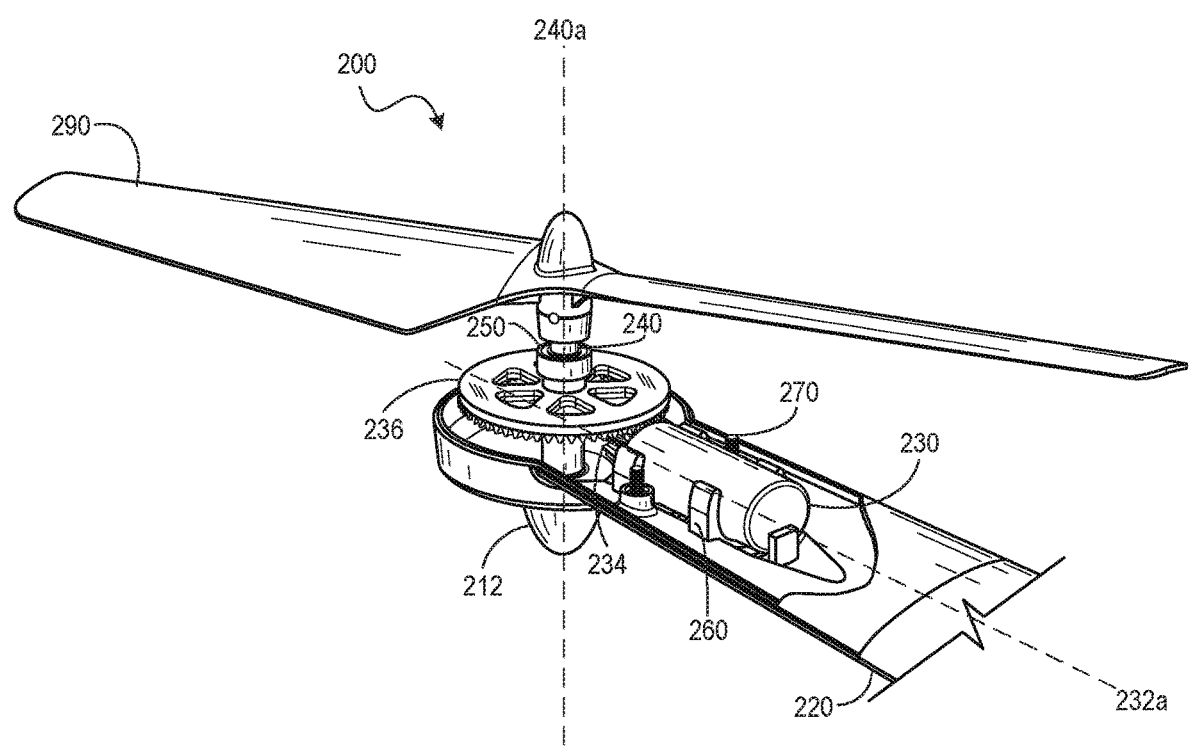
FIG. 3 is a cutaway view of a housing arm of a quadcopter illustrating an enclosed motor and drivetrain, according to an example embodiment.

FIG. 3 is a cutaway view of a housing arm of a quadcopter illustrating an enclosed motor and drive train, according to an example embodiment. FIG. 3 illustrates a leg 212, a housing arm 220 (with a top portion cutaway), a motor 230 with a motor output shaft 232 (not shown in FIG. 3 due to the perspective but shown in FIG. 4) with a motor axis of rotation 232a, a pinion gear 234, a bevel gear 236, a propeller driveshaft 240 with a propeller axis of rotation 240a, a bearing 250, a motor housing 260, screws 270, and a propeller 290.

The motor 230 is connected to a power source and a controller (such as an electronic speed controller). The motor 230 turns the motor output shaft and the pinion gear 234, which both rotate about the motor axis of rotation 232a. The teeth on the pinion gear 234 mesh with the teeth of the bevel gear 236 and cause rotation of the bevel gear 236. The bevel gear 236 and the propeller 290 are coupled to the propeller driveshaft 240 such that the bevel gear 236, the propeller driveshaft 240, and the propeller 290 rotate around the propeller axis of rotation 240a. FIG. 3 illustrates an indirect orthogonal drivetrain. In other words, the motor axis of rotation 232a is orthogonal to the propeller axis of rotation 240a. This is not meant to be limiting. By using different types of gearing (or transmission systems), the motor axis of rotation 232a may be at any angle (including 90 degrees) relative to the propeller axis of rotation 240a.

The motor 230 may be fixed to the housing arm 220 by a motor housing 260. FIG. 3 illustrates a motor housing 260. The motor housing 260 illustrated in FIG. 3 uses clips to hold the motor 230 fixed in place relative to the housing arm 220. Fixing the motor 230 in place reduces the amount of vibration on the motor 230 and its connected components during operation. Although a clip version of the motor housing 260 is illustrated in FIG. 3, various systems and methods may be used to fix the motor in place relative to the housing arm 220 and reduce vibration of the motor 230 and any of its connected components. One or more bearings 250 (or other shaft seals) may be used to allow rotation along a particular axis, such as the propeller axis of rotation 240a, and to mitigate friction between various components (e.g., between the propeller driveshaft 240, or the bevel gear 236, and the housing arm 220).

The housing 210 or the housing arm 220 may be composed of more than one portion. For example, the housing 210 may comprise a top portion and a bottom portion that are coupled together during operation to enclose various components and that may be separated for maintenance. In FIG. 3, screws 270 are illustrated that are used to couple the top portion of the housing 210 and the bottom portion of the housing 210. Other fasteners may be used as well, such as rivets, pins, pinned shafts, bolts, quick release fasteners (e.g., quarter turn fasteners, tension latches, quick release pins, slide pins, shear pins), or others.

Figure 4:
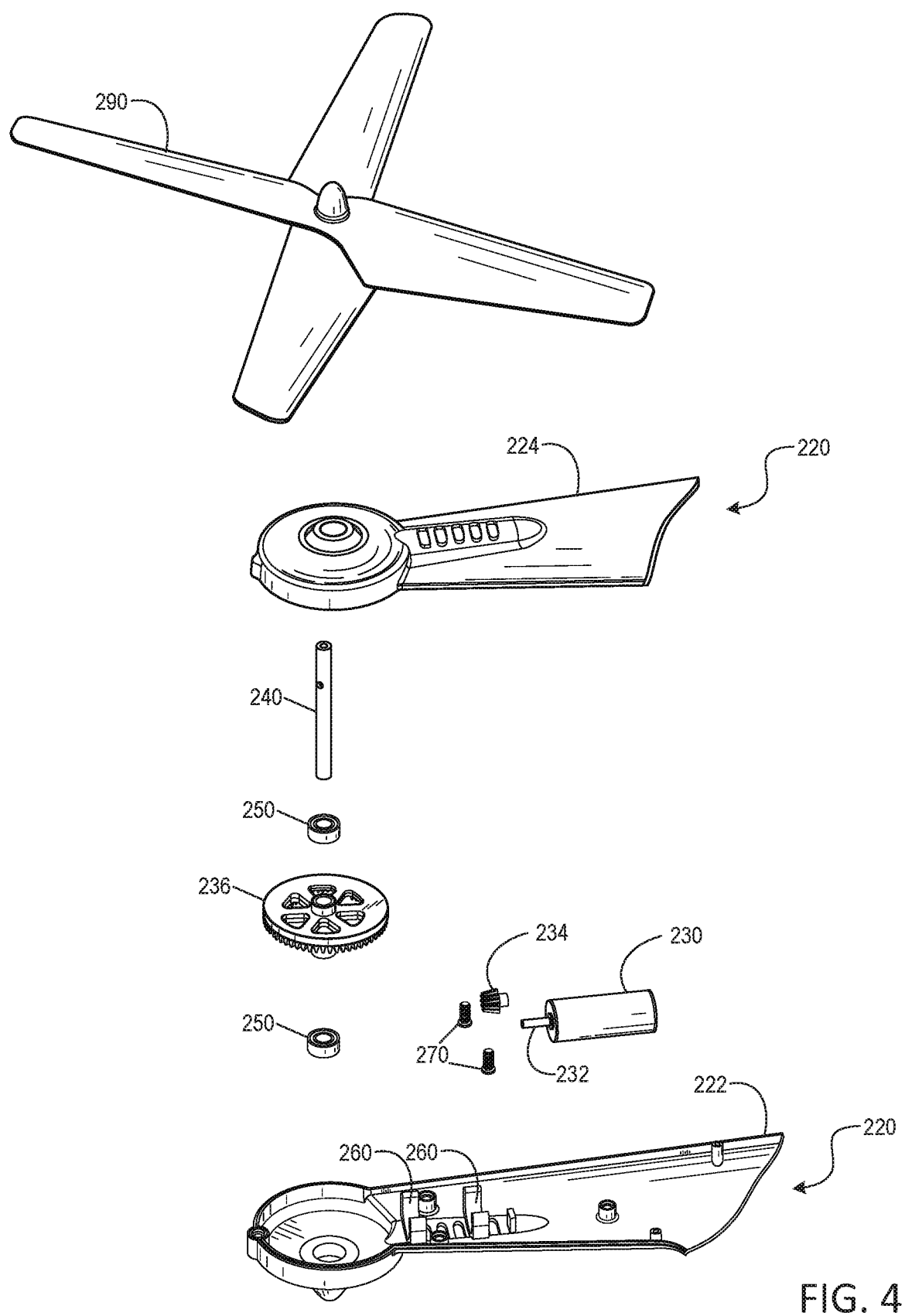
FIG. 4 is an exploded view of a housing arm of a quadcopter with a motor and drivetrain, according to an example embodiment.

The housing arm 220 is configured to enclose various components of the quadcopter 200, e.g., to provide debris protection (which provides technical utility because it increases the life span of components and reduces the amount of service required), to improve weight distribution and center of gravity characteristics, to increase structural integrity, to improve aerodynamic characteristics, and/or to improve packaging characteristics and aesthetics. For example, as shown in FIGS. 2-4, the housing arm 220 fully encloses the powertrain within each housing arm 220, including the motor 230, the motor output shaft 232, the pinion gear 234, the bevel gear 236, a portion of the driveshaft 240, a portion of the bearing 250 (and possibly other bearings 250 to the extent the gearbox or transmission system would benefit from other bearings), and the motor housing 260. Although shown in FIGS. 2-4 as fully enclosing the powertrain, the housing arm 220 may only partially enclose one or more parts of the powertrain.

FIG. 3 also illustrates a quadcopter 200 where the motor axis of rotation 232a is coplanar with a central axis of the housing arm (such as central housing arm axis 220a depicted in FIG. 2). By locating the motor axis of rotation 232a coplanar in this manner, this may improve weight distribution, center of gravity, and flight characteristics.

Although a pinion gear 234 and a bevel gear 236 are illustrated and described, this is not intended to be limiting. Various gearboxes, transmission systems, or other components may be used to translate the power and motion of the motor 230 from a first axis to a second axis.

FIG. 4 is an exploded view of a housing arm of a quadcopter with a motor and drivetrain, according to an example embodiment. FIG. 4 includes a housing arm 220 with a first portion 222 and a second portion 224, a motor 230, a motor output shaft 232, a pinion gear 234, a bevel gear 236, a driveshaft 240, bearings 250, a motor housing 260, screws 270, and a propeller 290. In connection and operation, the components of FIG. 4 may operate in the same or similar manner as that previously described in reference to FIGS. 3 and 4.

FIG. 4 illustrates an additional bearing from the one that can be seen in FIG. 3 that is located between the bevel gear and the bottom portion 222 and that may be used to reduce vibration or friction.

Figure 5:
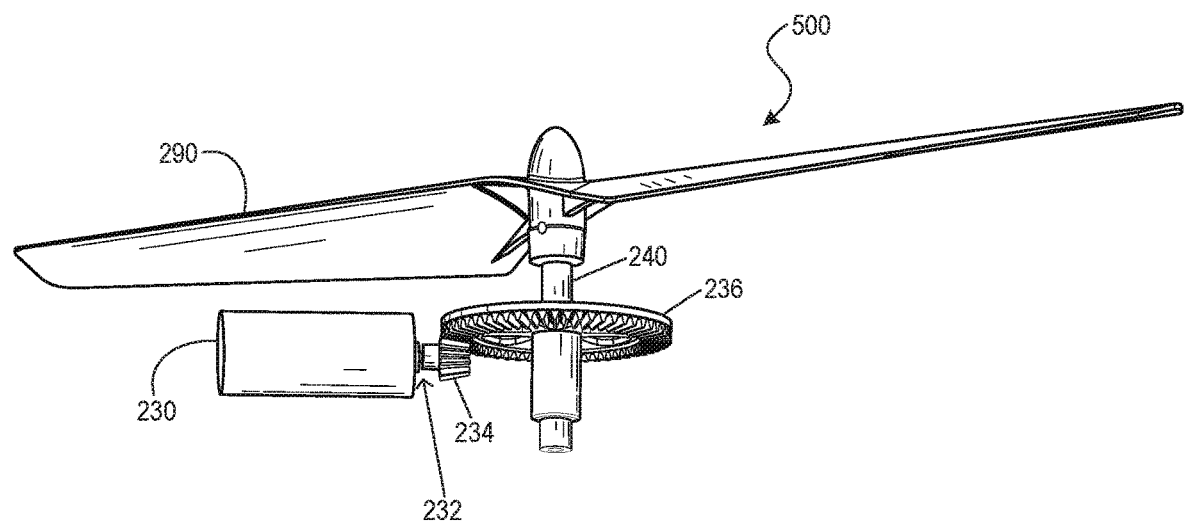
FIG. 5 is a perspective view of a powertrain of a quadcopter, according to an example embodiment.
Figure 6:
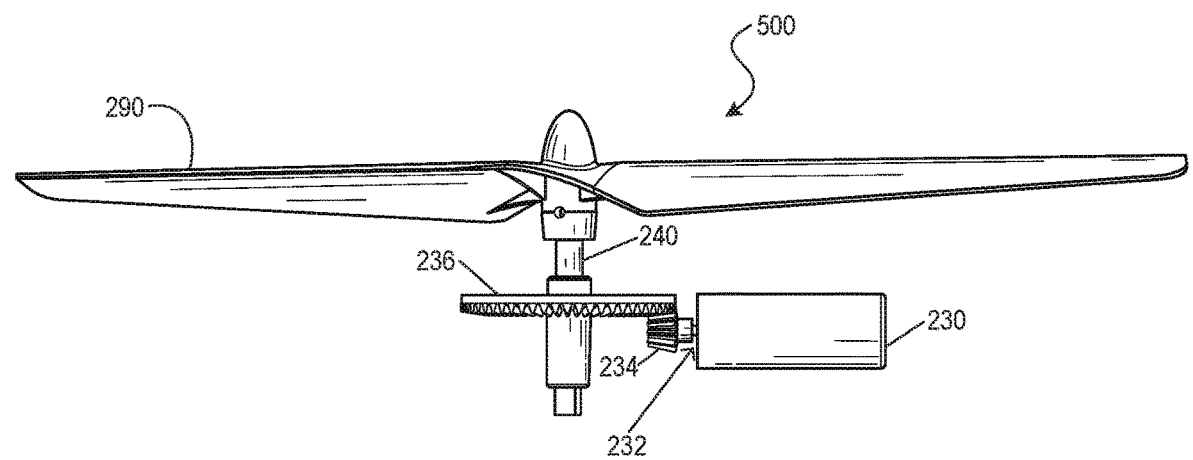
FIG. 6 is a side view of a powertrain of a quadcopter, according to an example embodiment.

FIG. 5 is a perspective view of a powertrain of a quadcopter, according to an example embodiment. FIG. 6 is a side view of a powertrain of a quadcopter, according to an example embodiment. The powertrain 500 includes a motor 230, a motor output shaft 232, a pinion gear 234, a bevel gear 236, a driveshaft 240, and a propeller 290. In connection and operation, the components of FIGS. 5 and 6 may operate in the same or similar manner as that previously described in reference to FIGS. 3-5.

While particular aspects and embodiments are disclosed herein, other aspects and embodiments will be apparent to those skilled in the art in view of the foregoing teaching. The various aspects and embodiments disclosed herein are for illustration purposes only and are not intended to be limiting, with the true scope and spirit being indicated by the following claims.

What is claimed is:

1. An RC rotorcraft comprising:
    a housing comprising a plurality of housing arms extending radially outward from the housing;
    wherein each of the plurality of housing arms at least partially encloses:
    a motor with a motor output shaft that rotates around a motor axis of rotation;
    a first gear coupled to the motor output shaft; and
    a second gear;
    wherein each second gear is coupled to a propeller drive shaft that rotates around a propeller axis of rotation that is not parallel to the motor axis of rotation;
    wherein each first gear meshes with each second gear to translate motion between the motor axis of rotation and the propeller axis of rotation; and
    wherein at least one propeller is coupled to each propeller drive shaft.

2. The RC rotorcraft of claim 1, wherein motor axis of rotation and the propeller axis of rotation are orthogonal.

3. The RC rotorcraft of claim 1, wherein the first gear is a pinion gear.

4. The RC rotorcraft of claim 1, wherein the second gear is a spur gear or a bevel gear.

5. The RC rotorcraft of claim 1, wherein the first axis motor axis of rotation is coplanar with a central axis of the housing arm.

6. The RC rotorcraft of claim 1, wherein each of the plurality of housing arms comprises a first portion and a second portion.

7. The RC rotorcraft of claim 6, wherein the motor, motor output shaft, first gear, and second gear of each of the plurality of housing arms are enclosed between the first portion and the second portion.

8. A quadcopter comprising:
   a housing comprising four housing arms extending radially outward from the housing;
   wherein each of the four housing arms at least partially encloses:
   a motor with a motor output shaft that rotates around a motor axis of rotation;
   a first gear coupled to the motor output shaft; and
   a second gear;
   wherein each second gear is coupled to a propeller drive shaft that rotates around a propeller axis of rotation that is not parallel to the motor axis of rotation;
   wherein each first gear meshes with each second gear to translate motion between the motor axis of rotation and the second axis; and
   wherein at least one propeller is coupled to each propeller drive shaft.

9. The quadcopter of claim 8, wherein the motor axis of rotation and the propeller axis of rotation are orthogonal.

10. The quadcopter of claim 8, wherein the first gear is a pinion gear.

11. The quadcopter of claim 8, wherein the second gear is a spur gear or a bevel gear.

12. The quadcopter of claim 8, wherein the motor axis of rotation is coplanar with a central axis of the housing arm.

13. The quadcopter of claim 8, wherein each of the plurality of housing arms comprises a first portion and a second portion.

14. The quadcopter of claim 13, wherein the motor, motor output shaft, first gear, and second gear of each of the plurality of housing arms are enclosed between the first portion and the second portion.

15. A quadcopter comprising:
   a housing comprising at least one housing arm that extends radially outward from the housing;
   wherein the at least one housing arm encloses:
   a motor with a motor output shaft that rotates around a motor axis of rotation;
   a first gear coupled to the motor output shaft; and
   a second gear;
   wherein the second gear is coupled to a propeller drive shaft that rotates around a propeller axis of rotation that is not parallel to the motor axis of rotation;
   wherein the first gear meshes with the second gear to translate motion between the motor axis of rotation and the propeller axis of rotation; and
   wherein a propeller is coupled to the propeller drive shaft.

16. The quadcopter of claim 15, further comprising a shaft seal coupled to the propeller drive shaft.

17. The quadcopter of claim 15, further comprising at least one bearing coupled to the propeller drive shaft.

18. The quadcopter of claim 15, further comprising a motor housing configured to hold the motor in a fixed position relative to the housing.

19. The quadcopter of claim 18, wherein the motor housing is coupled to the housing arm.

20. The quadcopter of claim 18, wherein the motor fits within the motor housing such that the motor axis of rotation is coplanar with a central axis of the housing arm.

* * * * *